United States Patent [19]

Ihara

[11] Patent Number: 4,564,875
[45] Date of Patent: Jan. 14, 1986

[54] CASSETTE LOADING DEVICE IN A CASSETTE TAPE RECORDER

[75] Inventor: Ryuji Ihara, Yokohama, Japan

[73] Assignee: Victor Company of Japan, Ltd., Yokohama, Japan

[21] Appl. No.: 380,426

[22] Filed: May 20, 1982

[30] Foreign Application Priority Data

May 29, 1981 [JP] Japan .............................. 56-78524[U]
May 29, 1981 [JP] Japan .............................. 56-78527[U]

[51] Int. Cl.[4] ...................... G11B 15/00; G11B 17/00
[52] U.S. Cl. .................................... 360/96.6; 360/96.5
[58] Field of Search ....................... 360/93, 96.1, 96.2, 360/96.5, 96.6, 137

[56] References Cited

U.S. PATENT DOCUMENTS

| | | | |
|---|---|---|---|
| 3,601,558 | 8/1971 | Sugaya et al. | 360/132 X |
| 3,950,787 | 10/1979 | Hosaka | 360/96.6 |
| 4,150,420 | 4/1979 | Tsumura | 360/137 |
| 4,159,495 | 6/1979 | Tsutsumi | 360/96.5 |
| 4,173,028 | 4/1979 | Hyodo | 360/96.6 |
| 4,314,294 | 2/1982 | Riccio et al. | 360/96.6 |

FOREIGN PATENT DOCUMENTS 1128165  4/1962  Fed. Rep. of Germany ..... 360/96.6
2931191  2/1981  Fed. Rep. of Germany .

Primary Examiner—Stuart N. Hecker
Assistant Examiner—David J. Severin
Attorney, Agent, or Firm—Louis Bernat

[57] ABSTRACT

A cassette loading device in a cassette tape recorder has a cassette housing adapted to accommodate a cassette extractably inserted thereinto and to move between a cassette extraction position and a cassette loading space. The cassette loading device comprises a cassette guiding member disposed to face the cassette loading space to guide the cassette into the cassette loading space. The cassette guiding member has inclined guide parts which function, in a case where the cassette loading operation is carried out with the cassette in a state wherein it is not completely accommodated within the cassette housing, to guide the rear part, as viewed in the insertion direction, of the cassette at an intermediate point in the entering movement of the cassette housing into the cassette loading space thereby to press the cassette fully and positively into the cassette housing.

6 Claims, 8 Drawing Figures

CASSETTE LOADING DEVICE IN A CASSETTE TAPE RECORDER

BACKGROUND OF THE INVENTION

The present invention relates generally to cassette loading devices in cassette tape recorders, and more particularly to a cassette loading device capable of positively loading a cassette into a loading space even in a case where the cassette is not fully or properly accommodated within its housing.

In general, the cassette loading device of a video cassette tape recorder is so constructed and adapted that a cassette is inserted into the interior of a housing when it is in its raised position, and the housing, together with the cassette therewithin, is pressed downward to be lowered, whereby the cassette is loaded into the loading space on the tape recorder side. In a known cassette loading device of this character, in a case where the cassette is fully or properly inserted in the housing, the cassette is properly and positively loaded. However, when the housing is pressed downward in a state of improper insertion of the cassette wherein the cassette has not been fully inserted into the housing and the rear side portion of the cassette is protruding even slightly out of the housing, the outwardly protruding rear side portion strikes the top plate of the cassette tape recorder, and the cassette loading operation is arrested in an intermediate point thereof. Furthermore, if in such a case the housing is pressed downward with great force, the cassette will be damaged upon colliding with the top plate.

SUMMARY OF THE INVENTION

Accordingly, it is a general object of the present invention to provide, in a cassette tape recorder, a novel and useful cassette loading device in which the above described problem has been solved.

Another and more specific object of the invention is to provide a cassette loading device in which is provided a cassette guiding member which functions during the lowering of the housing to guide the rear side portion of the cassette and to press it into the housing. According to the present invention, the cassette loading device is capable of carrying out cassette loading smoothly and positively even in a case where the cassette is not in a completely or positively inserted state in the housing.

Other objects and further features of the invention will become apparent from the following detailed description set forth in conjunction with the accompanying drawings.

DETAILED DESCRIPTION

Figure 1:
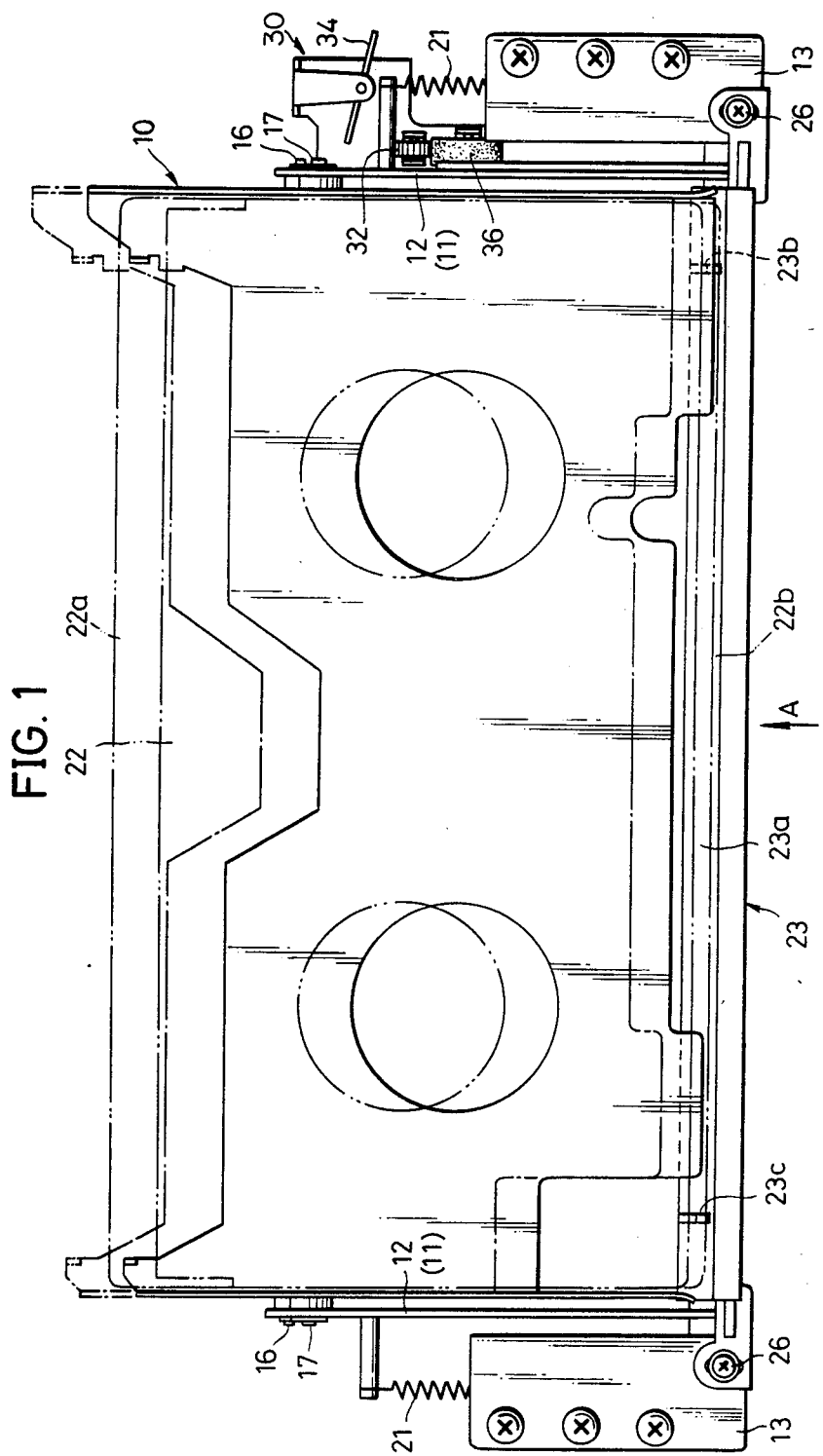
FIG. 1 is a plan view of one embodiment of the cassette loading device according to the present invention with the ceiling plate of the cassette housing and other parts deleted for the sake of clarity.
Figure 2:
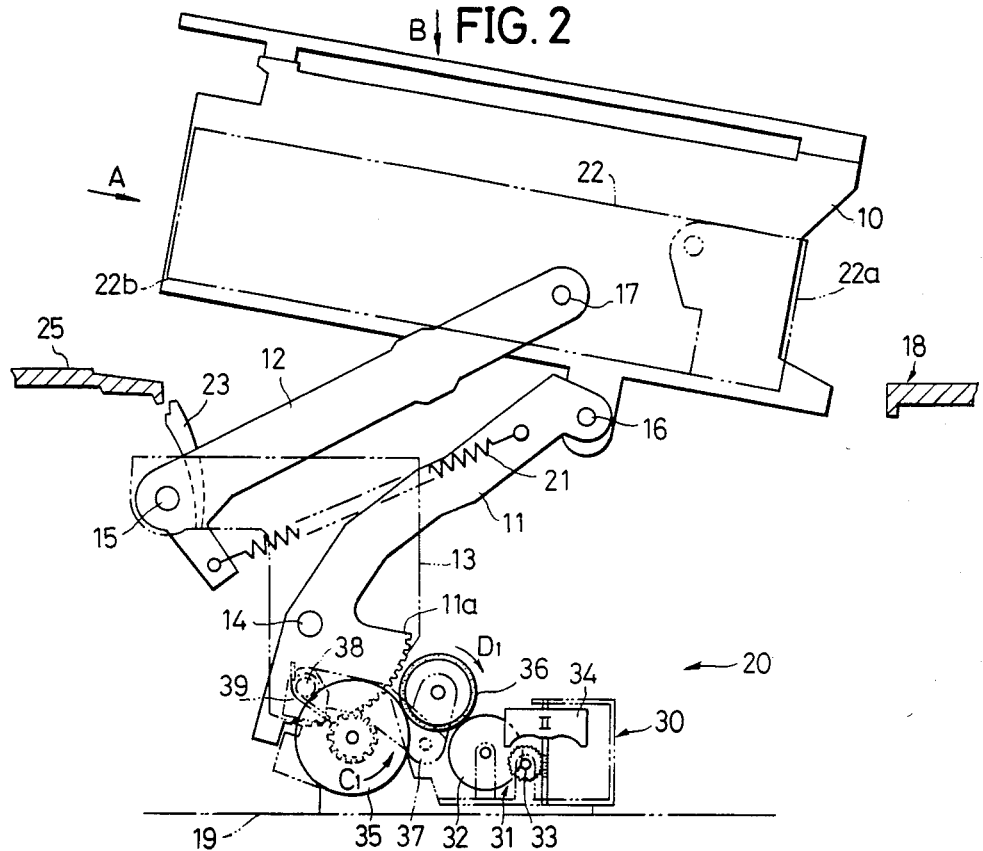
FIGS. 2 and 3 are right side views, with some parts in vertical section, respectively showing the cassette loading device in FIG. 1 in the state prior to cassette loading and the state after loading.
Figure 3:
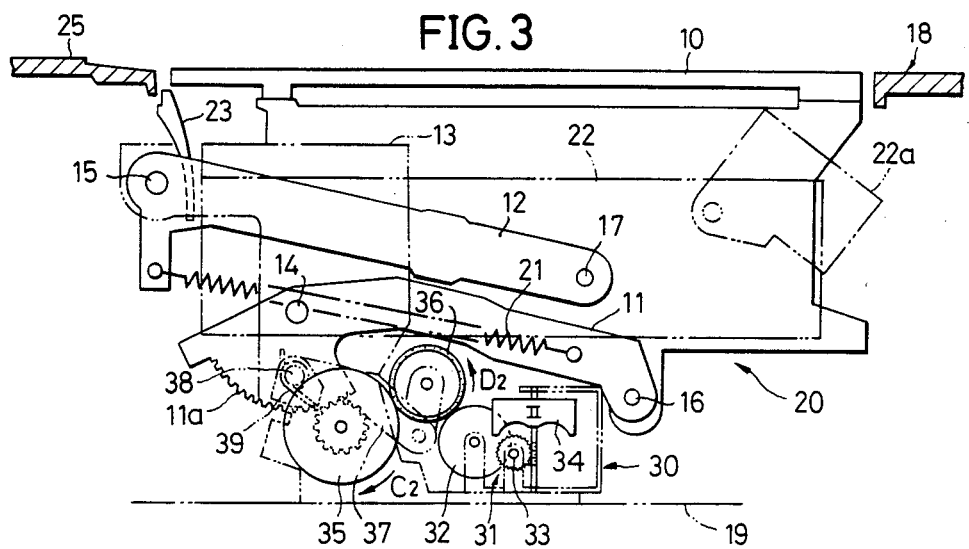

Referring first to FIGS. 1, 2, and 3, the cassette housing 10 shown therein is a frame structure comprising a bottom plate, a ceiling plate, and left and right side plates and is supported at its left and right sides with respect to flanges 13, 13 respectively by two pairs of support arms 11 and 12. The support arms 11 and 12 of each pair are pivotally supported at their proximal ends by pins 14 and 15, respectively, on their respective flange 13 and are pin-connected at their distal ends by pins 16 and 17 to the cassette housing 10. Thus, each pair of arms 11 and 12, their respective flange 13, and the cassette housing 10 constitute a four-bar linkage. The flanges 13, 13 are fixed to a chassis 19 of a video tape recorder structure 18.

Together with the counterclockwise and closkwise rotations (as viewed in FIGS. 2 and 3) of the arms 11 and 12, the housing 10 ascends and descends between a cassette-inserting position (or cassette extraction position), where the housing is thrust upward and outward from the top plate 25 of the video tape recorder, and a cassette loading space 20 within the tape recorder structure 18. The arms 11 and 12 of each pair are urged to rotate in the counterclockwise direction by the elastic force of a coil spring 21 stretched therebetween, whereby the housing 10 is urged to move in its ascending direction.

Cassette loading is carried out by first inserting a cassette 22 into the housing 10 in the arrow direction A with the device in the state indicated in FIG. 1 and with the cassette lid 22a on the front side, then pressing downward the housing 10 as indicated by arrow B in FIG. 2, and locking the same within the cassette loading space 20 as shown in FIG. 3. In FIG. 1, the housing 10 in the cassette extraction position is indicated by solid line, while the housing 10 in the cassette loading position is indicated by single-dot chain line. At the time of cassette loading, the cassette 22 descends rotationally as indicated by the sequence 22A→22B→22C in FIG. 4 until, finally, as indicated at 22D, it is loaded into the loading space 20 with the lid 22a in its opened state, the tape reels (not shown) becoming engaged with their corresponding reel discs (also not shown).

Figure 5A:
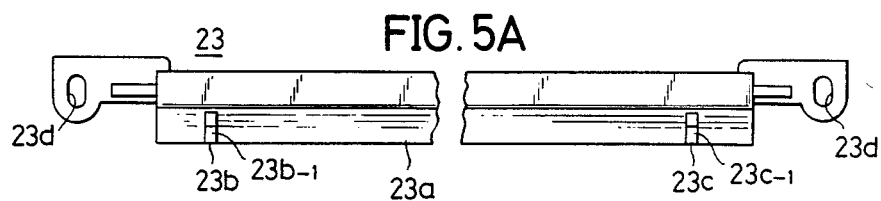
FIGS. 5A and 5B are respectively a plan view and a front view of the cassette guiding member.
Figure 5B:
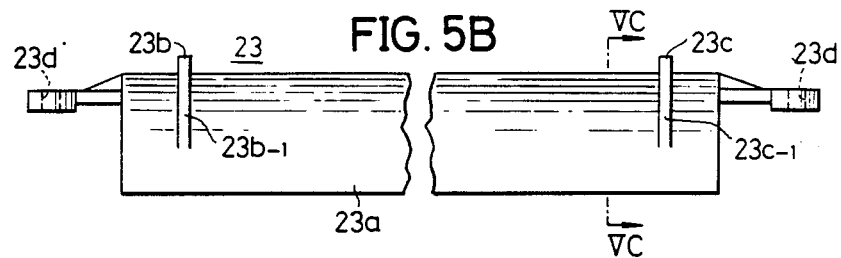
Figure 5C:
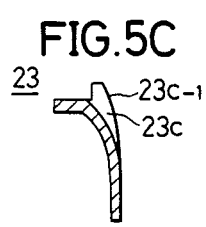
FIG. 5C is a sectional view taken in the plane indicated by line VC—VC in FIG. 5B as viewed in the arrow direction.

As shown in FIGS. 1, 2, and 3, a cassette guiding member 23 constituting an essential part of the present invention is disposed transversely at a position facing the rear part of the loading space 20 (the front part in FIG. 1 or the left side in FIGS. 2 and 3) within the tape recorder structure 18. As shown in FIGS. 5A, 5B, and 5C, this cassette guiding member 23 is so constructed that it has a main body part 23a with an inclined surface and, in the vicinity of its left and right ends, inclined ribs 23b and 23c projecting perpendicularly therefrom. Furthermore, this cassette guiding member 23 is a molded resin article in which the main body part 23a and the inclined ribs 23b and 23c are integrally formed. The cassette guiding member 23 is adjustably fixed to the flanges 13 by screws 26 passed through slots 23d, 23d at the left and right ends of the guiding member 23.

The manner in which the cassette 22 is guided by the cassette guiding member 23 during cassette loading will now be described with reference to FIG. 6.

The inclined ribs 23b and 23c of the cassette guiding member 23 are confronting the travel path 24A of the lower edge of the back face of the cassette 20 during cassette loading. Furthermore, the inclined ribs 23b and 23c have curved inclined guide surfaces 23b-1 and 23c-1 which are inclined toward the interior of the cassette loading space 20 and extend in curved line. The curvature of these curved inclined guide surfaces 23b-1 and 23c-1 is made greater than that of the above mentioned travel path 24A, that is, the radius of curvature of the guide surfaces 23b-1 and 23c-1 is smaller than that of the travel path 24A. These guide surfaces 23b-1 and 23c-1 are respectively at positions to contact the lower edge 22b of the rear side of a cassette 22 which happens to be loaded in an incompletely inserted state.

Figure 6:
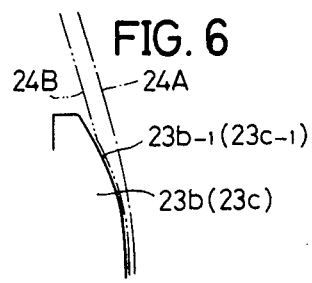
FIG. 6 is a side view indicating the cassette guiding movement of the cassette guiding member.

In the case where the cassette loading operation is carried out with the cassette 22 in the state wherein it has been inserted into the prescribed position within the housing 10, the travel path 24A of the lower edge 22b of the rear side portion of the cassette becomes as indicated by single-dot chain line in FIG. 6. This travel path 24A is separated somewhat from the inclined ribs 23b and 23c, and the cassette 22 travels without being guided by these inclined ribs 23b and 23c and is thus loaded into the loading space 20.

Figure 4:
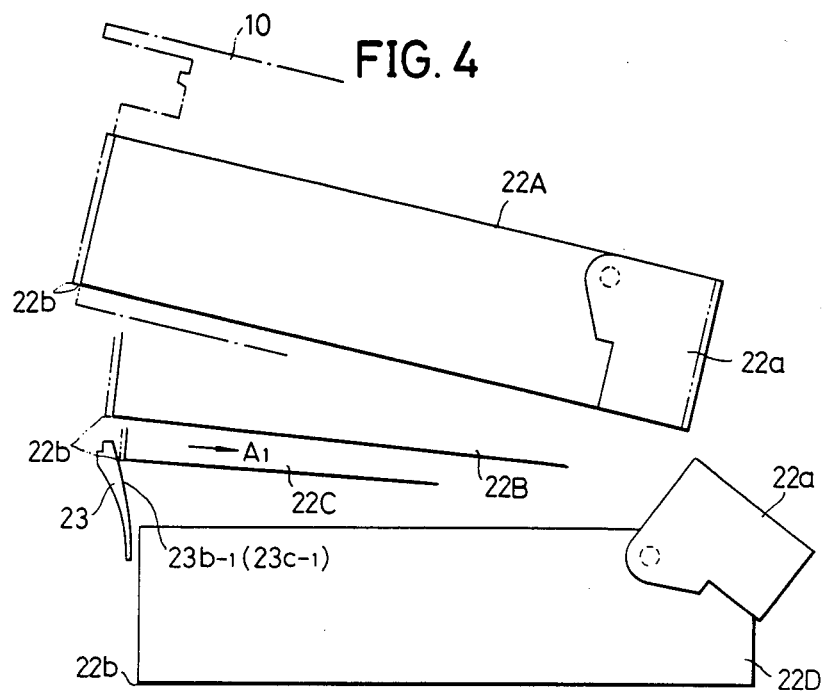
FIG. 4 is a side view indicating the movement of the cassette at the time of cassette loading in relation to a cassette guiding member.

On the other hand, in the case where the cassette loading operation is conducted with the cassette 22 in an incompletely inserted state wherein it has not been inserted fully into the innermost part of the housing 10, and the rear side (rear face side as viewed in the insertion direction) of the cassette 22 is protruding outside of the housing as indicated by two-dot chain line in FIG. 4, the lower edge 22b of the rear side portion of the cassette travels as indicated by two-dot chain line in FIG. 6. At an intermediate point in the cassette loading action, the lower edge 22b of the cassette rear portion strikes against the inclined ribs 23b and 23c and is guided by the above described curved inclined guide surfaces 23b-1 and 23c-1. Accordingly, at this intermediate point in the descending cassette loading action, the incompletely inserted cassette 22 is guided by the inclined ribs 23b and 23c and pressed inward in the arrow direction A1 in FIG. 4 as it descends, thereby being inserted fully into the specified loading position within the housing 10. As a final result, the cassette 22 is loaded in the correct manner into the loading space 20 in a state wherein it has been fully inserted into the housing 10. In FIG. 6, the line 24B represents the travel path of the lower edge 22b of the cassette rear portion in the case where the cassette loading action is carried out with the cassette 20 in the incompletely inserted state.

In this case, the cassette 22 is guided locally at parts near the left and right ends of the lower edge 22b of its rear portion and, moreover, by curved surfaces and is inserted into the housing 10 as it is guided more smoothly than it would be if it were guided by a planar inclined surface over the entire length of the lower edge 22b of its back face. As a result, the cassette loading is carried out smoothly.

In this connection, the main body part 23a of the cassette guide member 23 functions as the near-side wall of the cassette loading space 20 and has the effect of shielding off the interior of the cassette tape recorder from the outside.

Furthermore, a damper mechanism 30 as shown in FIGS. 1, 2, and 3 is incorporated in the above described cassette loading device. This damper mechanism 30 comprises a speed-increasing mechanism 31 (comprising a large-diameter gear 32 and a small-diameter gear 33) and a vane wheel 34 rotated at high velocity by the speed-increasing mechanism 31 to operate as an air brake. A sector gear 11a is formed integrally with the aforedescribed support arm 11 at the proximal end thereof to rotate about the pin 14 and is meshed with a stepped gear 35 rotatably supported on the flange 13. An idler wheel 36 having a rubber ring around its periphery is rotatably supported on the outer distal end of an arm 37 and is disposed between the stepped gear 35 and the above mentioned large-diameter gear 32. The arm 37 is pivotally supported at its proximal end by a pin 38 and is urged by the elastic torsion of a torsion spring 39 to rotate in the clockwise direction as viewed in FIGS. 2 and 3.

At the time of cassette loading, the support arm 11 rotates in the clockwise direction, and its sector gear 11a turns the stepped gear 35 in the arrow direction C1. As a consequence, the idler wheel 36 is subjected to torque urging it to rotate in the arrow direction D1, but this rotational direction is the direction of "escape" or "repulsion" with respect to the gear 35 on the driving side. Moreover, since the torque required to rotate the large-diameger gear 32 is great, the idler wheel 36 actually does not rotate. Consequently, the gear 35 rotates independently while slipping relative to the idler wheel 36 (no noise being generated at this part), and the damper mechanism remains in its stopped state.

As a result, the cassette loading operation is accomplished smoothly and, moreover, without the generation of any unpleasant noise, by the exertion of only a little force to overcome the force of the coil spring 21 without the application of a load due to the damper mechanism 30.

At the time of extraction or removal of the cassette, the support arm 11 is swung in the counterclockwise direction by the force of the coil spring 21, and its sector gear 11a drives the gear 35 to rotate in the arrow direction C2. This rotation of the gear 35 is transmitted to the idler wheel 36, which thereupon rotates in the arrow direction D2. Since this arrow direction D2 is that of "biting in" or "attraction" with respect to the gear 35, the idler wheel 36 positively transmits the rotation of the gear 35, without slippage therebetween, to the speed-increasing mechanism 31 of the damper mechanism 30, whereby the vane wheel 34 is rotated at high velocity.

Thus the ascent of the housing 10 is accompanied by the operation of the damper mechanism 30, and the cassette extraction operation in a damped manner.

It is to be noted that the cassette loading device according to the present invention is not limited in its application to a video tape recorder but is similarly applicable to an audio tape recorder.

Further, the present invention is not limited to these embodiments, but various variations and modifications may be made without departing from the scope of the present invention.

What is claimed is:

1. A cassette loading device in a cassette tape recorder having a cassette housing adapted to receive and accommodate a cassette which is extractably inserted thereinto, said housing moving between a cassette extraction position and a cassette loading space, said cassette loading device comprising a pair of flanges mounted on a chassis, two pair of support arms having top ends which are pivotally connected to the cassette housing and bottom ends which are connected to said pair of flanges so that the cassette housing is supported and substantially vertically displaced between the cassette extraction position and the cassette loading space, and a cassette guiding member having a curved surface which is disposed to face said cassette loading space in order to guide the cassette into said cassette loading space, said curved surface having a pair of protruding and inclined guide ribs which function, during a cassette loading operation with the cassette in a state wherein it is not completely accommodated within the cassette housing, to guide the rear part as viewed in the insertion direction of the cassette at an intermediate point during the entering of the cassette housing wherein upon completion of the cassette loading operation, the cassette guiding member does not contact the cassette into the cassette loading space to press the cassette fully and positively into the cassette housing.

2. A cassette loading device as claimed in claim 1 in which the cassette guiding member has slots through which mounting screws are inserted and screwed into parts of the cassette tape recorder, whereby the cassette guiding member is positionally adjustably mounted on the tape recorder.

3. A cassette loading device as claimed in claim 1 in which said curved surface has a greater curvature and a smaller radius of curvature than the curvature and radius of the path followed by the movement of the rear part of the cassette as viewed in the insertion direction during the time of the cassette loading.

4. A cassette loading device as claimed in claim 1 in which said pair of protruding and inclined guide ribs are respectively located in the vicinity of the left and right ends of said member.

5. A cassette loading device as claimed in claim 4 in which the guiding member has the function of shielding the interior of the cassette tape recorder from the outside.

6. A cassette loading device as claimed in claim 5 in which the cassette guiding member is a molded resin article in which the pair of ribs are formed integrally.

* * * * *